United States Patent [19]

Uchida et al.

[11] Patent Number: 5,258,135
[45] Date of Patent: Nov. 2, 1993

[54] LIQUID CRYSTAL COMPOSITION AND LIQUID CRYSTAL DISPLAY USING SAID COMPOSITION

[75] Inventors: Keiko Uchida, Ohnojoshi; Taku Hirose; Shinichi Sawada, both of Ichiharashi, all of Japan

[73] Assignee: Chisso Corporation, Osaka, Japan

[21] Appl. No.: 912,118

[22] Filed: Jul. 9, 1992

Related U.S. Application Data

[63] Continuation of Ser. No. 624,567, Dec. 11, 1990, abandoned.

Foreign Application Priority Data

Dec. 13, 1989 [JP] Japan .................................. 1-322889

[51] Int. Cl.⁵ .......................... C09K 19/30; G02F 1/13
[52] U.S. Cl. .......................... 252/299.63; 252/299.01; 359/106
[58] Field of Search .................. 252/299.01, 299.63, 252/299.65; 359/102, 106

[56] References Cited

U.S. PATENT DOCUMENTS

| | | | |
|---|---|---|---|
| 4,468,340 | 8/1984 | Inoue et al. | 252/299.63 |
| 4,507,222 | 3/1985 | Inoue et al. | 252/299.63 |
| 4,822,519 | 4/1989 | Saito et al. | 252/299.61 |
| 4,877,549 | 10/1989 | Sawada et al. | 252/299.63 |
| 5,102,577 | 4/1992 | Uchida et al. | 252/299.01 |
| 5,202,055 | 4/1993 | Uchida et al. | 252/299.63 |

FOREIGN PATENT DOCUMENTS

| | | |
|---|---|---|
| 0364588 | 4/1990 | European Pat. Off. |
| 8903867 | 5/1989 | World Int. Prop. O. |

Primary Examiner—Robert L. Stoll
Assistant Examiner—Shean C. Wu
Attorney, Agent, or Firm—Leydig, Voit & Mayer

[57] ABSTRACT

Liquid crystal compositions comprising: at least one of the compounds of the general formula (I) and at least one of the compounds of the general formula (II); and optionally including at least one of the compounds of the general formula (III), or, when compound (III) is present, optionally including at least one of the compounds of the general formula (IV) are provided.

General Formula (I):

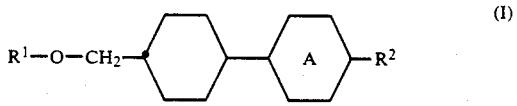

General Formula (II):

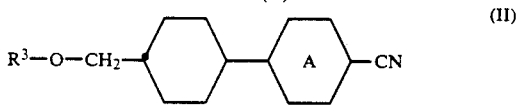

General Formula (III):

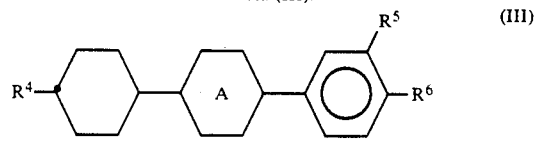

General Formula (IV):

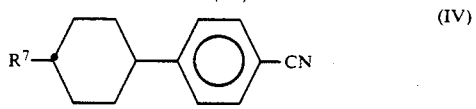

All the symbols are as defined in the appended claims, namely, $R^1$ is an alkyl group having 1 to 5 carbon atoms; $R^2$ is an alkyl group having 2 to 8 carbon atoms; $R^3$ is an alkyl group having 1 to 5 carbon atoms; $R^4$ is an alkyl group having 2 to 8 carbon atoms; $R^5$ is H or F; $R^6$ is an alkyl group having 1 to 8 carbon atoms, an alkoxyl group having 1 to 8 carbon atoms, F, or a CN group; and $R^7$ is an alkyl group having 2 to 10 carbon atoms or an alkenyl group having 2 to 10 carbon atoms. The compositions are suitable for use in highly multiplexed displays of the supertwisted birefringence effect mode.

20 Claims, No Drawings

LIQUID CRYSTAL COMPOSITION AND LIQUID CRYSTAL DISPLAY USING SAID COMPOSITION

This application is a continuation of application Ser. No. 07/624,567, filed Dec. 11, 1990 now abandoned.

FIELD OF THE INVENTION

The present invention relates to a liquid crystal composition, and a liquid crystal display using the liquid crystal composition. More particularly, it is concerned with a liquid crystal composition suitable for use in highly multiplexed displays of a supertwisted birefringence effect mode, and a liquid crystal display using the liquid crystal composition.

BACKGROUND OF THE INVENTION

TN (twisted nematic) liquid crystal cells having a twist angle of 90° have heretofore been used as display terminals of about 1/100 duty cycle, such as watches and electric calculators. In view of the principle, however, it has been believed that it is difficult to increase the number of duty cycles to more than the above value, because it is accompanied by a reduction of display quality.

On the contrary, a supertwisted birefringence effect mode utilizing the birefringence of a liquid crystal cell in which the highest possible twist angle to produce bistability, one of electro-optic characteristics of a chiral nematic liquid crystal, is controlled between 180° and 270° can be used as a liquid crystal display device of about 1/400 duty cycle. This system is hereinafter referred to as an "SBE mode", including supertwisted nematic modes using an aligning organic film, called an STN mode and an HBE mode.

T. J. Scheffer and J. Nehling disclosed in Appl. Phys. Lett., 45, 1021 (1984) that the above SBE mode can provide a matrix display in which a display device is driven in the same driving manner as that of a matrix of the conventional 90° twisted TN mode, i.e., the fast scan addressing mode responding to the effective value of applied voltage. It is also reported that the SBE mode display has a much higher contrast and a much wider viewing angle than the 90° twisted TN display.

Liquid crystal compositions to be used in liquid crystal displays of the SBE mode are required to have the following characteristics:

(1) a steep voltage-transmittance curve, (2) a high nematic-isotropic liquid phase transition temperature, i.e., clearing point (NI), and (3) a low viscosity ($\eta$).

The characteristic (1) above is necessary for increasing the display contrast of liquid crystal displays of the SBE mode The characteristic (2) is needed to avoid coloring of the displays due to temperature dependency of refractive index anisotropy in the SBE mode; it is desirable that the clearing point be as high as possible.

In liquid crystal cells of the SBE mode, it is desirable that the viscosity be as low as possible, because the response time is in proportion to $\eta \cdot d^2$ wherein d indicates a cell thickness.

In fact, however, the conventional liquid crystal compositions fail to satisfy the above requirements; a liquid crystal composition satisfying the above requirements and thus suitable for use in displays of the SBE mode has not been found heretofore.

SUMMARY OF THE INVENTION

An object of the present invention is to provide a liquid crystal composition, particularly suitable for use in liquid crystal displays of the SBE mode.

Another object of the present invention is to provide a liquid crystal composition which has a high clearing point and is excellent in the steepness of the voltage-transmittance curve.

Another object of the present invention is to provide a nematic liquid crystal composition which has a high clearing point and a low viscosity, is excellent in the steepness of the voltage-transmittance curve, and thus which provides high multiplexing.

Still another object of the present invention is to provide a liquid crystal display of the SBE mode, which is excellent in contrast.

It has been found that the above objects can be attained by combining the specified compounds represented by the general formulas (I), (II), (III) and (IV) as defined hereinafter.

The present invention relates to a liquid crystal composition comprising:

(1) a first component consisting of at least one compound selected from the compounds represented by the general formula (I):

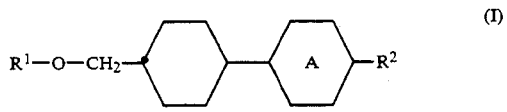

$R^1$ is an alkyl group having 1 to 5 carbon atoms, preferably a linear alkyl group having 1 to 5 carbon atoms; and $R^2$ is an alkyl group having 2 to 8 carbon atoms, preferably a linear alkyl group having 2 to 8 carbon atoms, and at least one compound selected from the compounds represented by the general formula (II):

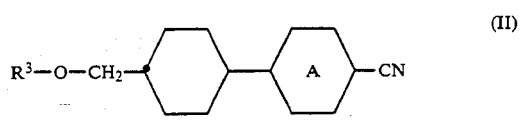

is the same as defined above; and $R^3$ is an alkyl group having 1 to 5 carbon atoms, preferably a linear alkyl group having 1 to 5 carbon atoms and (2) a second component consisting of at least one compound selected from the compounds represented by the general formula (III):

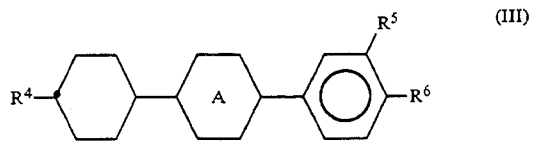

wherein 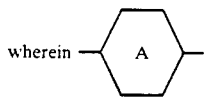

is the same as defined above; and R⁴ is an alkyl group having 2 to 8 carbon atoms, preferably a linear alkyl group having 2 to 8 carbon atoms; R⁵ is H or F; and R⁶ is an alkyl group having 1 to 8 carbon atoms, preferably a linear alkyl group having 1 to 8 carbon atoms, an alkoxyl group having 1 to 8 carbon atoms, preferably a linear alkoxyl group having 1 to 8 carbon atoms, F or a CN group.

The present invention further relates to a liquid crystal composition comprising:

the above first and second components; and (3) a third component consisting of at least one compound selected from the compounds represented by the general formula (IV):

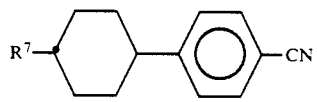 (IV)

wherein R⁷ is an alkyl group having 2 to 10 carbon atoms, preferably a linear alkyl group having 2 to 10 carbon atoms or an alkenyl group having 2 to 10 carbon atoms, preferably a linear alkenyl group having 2 to 10 carbon atoms.

The present invention further relates to a liquid crystal display using any one of the above liquid crystal compositions.

In the present invention,

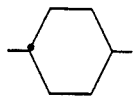

represents a trans-cyclohexylene ring, and

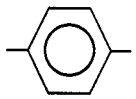

represents a p-phenylene ring.

DETAILED DESCRIPTION OF THE INVENTION

The first component comprises at least one compound represented by the general formula (I) and at least one compound represented by the general formula (II).

Of the compounds of the general formula (I), i.e., compounds represented by the following general formulas:

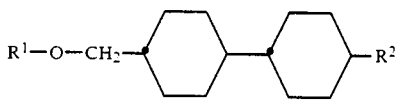

and

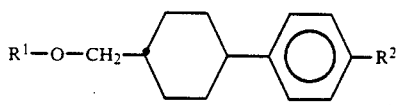

wherein R¹ and R² have the same meanings as defined above, compounds of the general formula (I) wherein

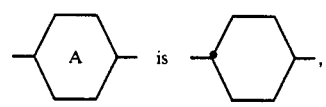

R¹ is a linear alkyl group having 1 to 3 carbon atoms, and R² is a linear alkyl group having 2 to 5 carbon atoms are preferably used.

Examples of such preferred compounds are:
trans-4-(trans-4-methoxymethylcyclohexyl)propylcyclohexane,
trans-4-(trans-4-methoxymethylcyclohexyl)butylcyclohexane,
trans-4-(trans-4-methoxymethylcyclohexyl)pentylcyclohexane, and
trans-4-(trans-4-methoxymethylcyclohexyl)ethylcyclohexane.

The compounds of the general formula (I) are characterized by having an alkoxymethyl group at the terminal thereof. It has now been found according to the present invention that the compounds having an alkoxymethyl group at the terminal thereof provide a large pretilt angle on a polyimide-based aligning film commonly used for the SBE mode.

It is generally known, as described in M. Akatsuka et al., Japan Display, pp. 400–403 (1986), that as the pretilt angle increases, a d/p margin, i.e., $\Delta(d/p)$ as represented by the equation shown below becomes larger.

$$\Delta(d/p) = (d_2 - d_1)/p$$

where:
d = cell thickness,
p = helical pitch length,
$d_1$ = twist region in non-voltage applied condition, i.e., as obtained when a liquid crystal compound is placed in a wedge cell, and
$d_2$ = striped domain region in voltage applied condition, i.e., as formed in neighborhood of threshold voltage.

As the d/p margin becomes larger, the yield of the cell and the degree of freedom of the cell thickness increase. For this reason, in the SBE mode, the d/p margin is desired to be large.

Thus the compounds of the general formula (I) are important for the liquid crystal composition of the present invention, particularly when the composition is used in liquid crystal displays of the SBE mode, in that the compounds increase the degree of freedom of the cell thickness.

A 15% by weight solution of trans-4-(trans-4-methoxymethylcyclohexyl)propylcyclohexane, one of the compounds of the general formula (I), in a cyanobiphenyl-based composition (trade name: GR-63, produced by Chisso Corp.) has a pretilt angle of 7.9°. On the other hand, a pretilt angle as determined in the same manner as above of trans-4-(trans-4-propylcyclohexyl)propylcyclohexane, which has the same skeleton as that of the above compound, but has an alkyl group in place of the alkoxymethyl group as the terminal group, is 7.1°.

In determining the pretilt angle, the sample is placed in a cell having a polyimide-based aligning film (trade name: PSI-A-2101, produced by Chisso Corp.) subjected to antiparallel rubbing treatment, and then the pretilt angle is measured according to the crystal rotation method (see T. J. Scheffer et al., Journal of Applied Physics, Vol. 48, No. 5, pp. 1783-1792 (1977)).

The compounds of the general formula (I) have clearing points ranging between about 20° C. and 50° C., and have particularly low viscosities.

The compounds of the general formula (I) are known compounds and are described in, for example, Japanese Patent Application Laid-Open No. 167535/1983.

Of the compounds of the general formula (II), i.e., compounds represented by the following general formulas:

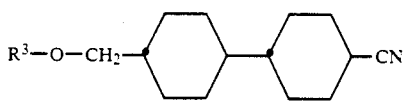

and

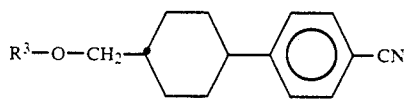

wherein $R^3$ has the same meaning as indicated above, compounds of the general formula (II) wherein

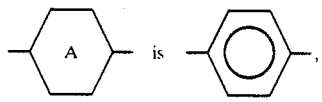

and $R^3$ is a linear alkyl group having 1 to 3 carbon atoms are preferably used.

Examples of such preferred compounds are:
4-(trans-4-methoxymethylcyclohexyl)benzonitrile,
4-(trans-4-ethoxymethylcyclohexyl)benzonitrile, and
4-(trans-4-propoxymethylcyclohexyl)benzonitrile.

The compounds of the general formula (II) are characterized by having an alkoxymethyl group at the terminal thereof like the compounds of the general formula (I), and thus they provide a large pretilt angle on a polyimide-based film.

Trans-4-(trans-4-methoxymethylcyclohexyl)benzonitrile, one of the compounds of the general formula (II), has a pretilt angle as determined in the same manner as above of 7.0°. On the other hand, a pretilt angle of trans-4-(trans-4-ethylcyclohexyl)benzonitrile, which has the same skeleton as that of the above compound, but has an alkyl group as the terminal group, is 6.0°.

From the foregoing results, it can be said that the compounds of the general formulas (I) and (II) have larger pretilt angles, i.e., larger d/p margins than those compounds having an alkyl group at the terminal thereof.

Moreover, the compounds of the general formula (II) have clearing points ranging between about 20° C. and 70° C., and large positive dielectric anisotropy. This dielectric anisotropy is hereinafter indicated by $\Delta\epsilon$.

The compounds of the general formula (II) are known compounds and are described in, for example, Japanese Patent Application No. 59956/1983.

The second component comprises at least one compound selected from the compounds represented by the the general formula (III), more specifically at least one of the compounds represented by the general formulas:

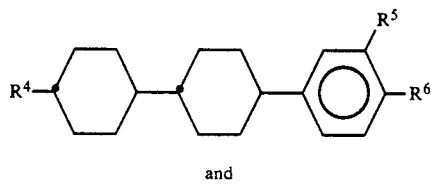

and

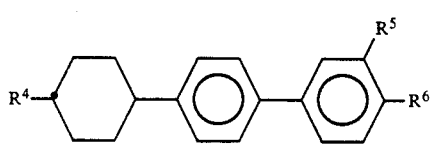

wherein $R^4$, $R^5$ and $R^6$ have the same meanings as indicated above.

Typical examples of the compounds of the general formula (III) are:
4-{trans-4-(trans-4-ethylcyclohexyl)cyclohexyl}benzonitrile,
4-{trans-4-(trans-4-propylcyclohexyl)cyclohexyl}benzonitrile,
4-{trans-4-(trans-4-butylcyclohexyl)cyclohexyl}benzonitrile,
4-{trans-4-(trans-4-pentylcyclohexyl)cyclohexyl}benzonitrile,
4-{trans-4-(trans-4-heptylcyclohexyl)cyclohexyl}benzonitrile,
4-{trans-4-(trans-4-ethylcyclohexyl)cyclohexyl}methylbenzene,
4-{trans-4-(trans-4-ethylcyclohexyl)cyclohexyl}ethylbenzene,
4-{trans-4-(trans-4-propylcyclohexyl)cyclohexyl}methylbenzene,
4-{trans-4-(trans-4-butylcyclohexyl)cyclohexyl}methylbenzene,
4-{trans-4-(trans-4-propylcyclohexyl)cyclohexyl}ethylbenzene,
4-{trans-4-(trans-4-ethylcyclohexyl)cyclohexyl}propylbenzene,
4-{trans-4-(trans-4-propylcyclohexyl)cyclohexyl}propylbenzene,
4-{trans-4-(trans-4-ethylcyclohexyl)cyclohexyl}methoxybenzene
4-{trans-4-(trans-4-ethylcyclohexyl)cyclohexyl}ethoxybenzene,
4-{trans-4-(trans-4-propylcyclohexyl)cyclohexyl}methoxybenzene,
4-{trans-4-(trans-4-propylcyclohexyl)cyclohexyl}ethoxybenzene,
4-{trans-4-(trans-4-propylcyclohexyl)propoxybenzene,
4-{trans-4-(trans-4-ethylcyclohexyl)cyclohexyl}fluorobenzene,
4-{trans-4-(trans-4-propylcyclohexyl)cyclohexyl} fluorobenzene,
4-{trans-4-(trans-4-butylcyclohexyl)cyclohexyl}fluorobenzene, 4-{trans-4-(trans-4-pentylcyclohexyl)cyclohexyl} fluorobenzene,
4-{trans-4-(trans-4-ethylcyclohexyl)cyclohexyl}-1,2-difluorobenzene,
4-{trans-4-(trans-4-propylcyclohexyl)cyclohexyl}-1,2-difluorobenzene,
4-{trans-4-(trans-4-butylcyclohexyl)cyclohexyl}-1,2-difluorobenzene,
4-{trans-4-(trans-4-pentylcyclohexyl)cyclohexyl}-1,2-difluorobenzene,
4-(trans-4-ethylcyclohexyl)-4'-ethylbiphenyl,
4-(trans-4-propylcyclohexyl)-4'-ethylbiphenyl,
4-(trans-4-butylcyclohexyl)-4'-ethylbiphenyl, and
4-(trans-4-pentylcyclohexyl)-4'-ethylbiphenyl.

Of the compounds of the general formula (III), compounds represented by the general formula:

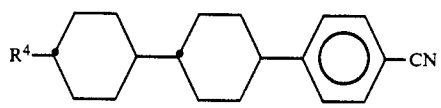

wherein $R^4$ has the same meaning as indicated above, are particularly preferred to use.

The compounds of the general formula (III) are known compounds and are described in, for example, Japanese Patent Application Laid-Open Nos. 10552/1983, 21359/1982, 64626/1982, 154135/1982, 152362/1984, and 165328/1982, and Japanese Patent Publication Nos. 3324/1983, 34928/1985, 7169/1988, and 4496/1989.

The compounds of the general formula (III) are low in viscosity although they have three six-membered rings, and they are high temperature liquid crystal compounds having a clearing point ranging between about 100° C. and 250° C.

The third component comprises at least one compound selected from the compounds represented by the general formula (IV). Of these compounds, compounds of the general formula (IV) in which $R^7$ is a linear alkyl group having 2 to 7 carbon atoms or a linear alkenyl group having 3 to 5 carbon atoms are preferably used. When $R^7$ is an alkenyl group, the position at which the double bond is located is not critical, but it is desired that an inner double bond be in a transconfiguration.

Examples of such preferred compounds are:
4-(trans-4-ethylcyclohexyl)benzonitrile,
4-(trans-4-propylcyclohexyl) benzonitrile,
4-(trans-4-butylcyclohexyl)benzonitrile,
4-(trans-4-pentylcyclohexyl)benzonitrile,
4-(trans-4-heptylcyclohexyl)benzonitrile,
4-{trans-4-(2-propenyl)cyclohexyl}benzonitrile,
4-{trans-4-(3-butenyl)cyclohexyl}benzonitrile,
4-{trans-4-(2-butenyl)cyclohexyl}benzonitrile,
4-{trans-4-(2-pentenyl)cyclohexyl}benzonitrile,
4-{trans-4-(3-pentenyl)cyclohexyl}benzonitrile, and
4-{trans-4-(4-pentenyl)cyclohexyl}benzonitrile.

The compounds of the general formula (IV) are known compounds and are described in, for example, Japanese Patent Publication No. 38146/1981 and Japanese Patent Application Laid-Open No. 176221/1984.

The compounds of the general formula (IV) are characterized in that $\Delta\epsilon$ is positive and large and the viscosity is low, but they have clearing points as low as about 30° to 70° C.

When two or more of the compounds of the general formula (I), (II), (III), or (IV) are used in combination with each other, the proportions of the compounds used are not critical and can be determined appropriately depending on the desired characteristics of a liquid crystal composition to be prepared.

The liquid crystal composition of the present invention, in one embodiment thereof, contains the above-described first and second components as main components.

The proportion of the first component is 20 to 50% by weight based on the total weight of the liquid crystal composition. If the proportion of the first component is less than 20% by weight, the d/p margin is not increased insufficiently. On the other hand, if the proportion of the first component is more than 50% by weight, in some cases, the clearing point of the resulting liquid crystal composition is decreased. This decrease in the clearing point is undesirable because the temperature dependency of refractive index anisotropy ($\Delta n$) is increased, leading to changes in an optical path ($d \cdot \Delta n$) of birefringence, and thus to changes in color.

The proportion of the second component is 10 to 70% by weight based on the total weight of the liquid crystal composition. If the proportion of the second component is less than 10% by weight, the clearing point of the resulting liquid crystal composition is sometimes decreased. On the other hand, if the proportion of the second component is more than 70% by weight, the lower limit temperature of the nematic phase is increased. This increase of the lower limit temperature is undesirable because the operating temperature range at the lower temperature side is sometimes reduced.

The total amount of the first and second components is at least 40% by weight of the composition. If the total amount is less than 40% by weight, in some cases, the nematic phase temperature range of the resulting composition is not sufficiently wide.

Although the ratio of the first component to the second component is not critical, it is preferred that the weight ratio of the first component to the second component (first component/second component) be 0.2/1 to 5/1.

In another embodiment, the liquid crystal composition of the present invention contain, as well as the first and second components, the third component as main components. The proportions of the first and second components are the same as in the aforementioned liquid crystal composition. That is, the proportions of the first, and second components are 20 to 50% by weight and 10 to 70% by weight, respectively, based on the total weight of the liquid crystal composition.

The proportion of the third component is 10 to 40% by weight and preferably 10 to 30% by weight. If the proportion of the third component is less than 10% by weight, the threshold voltage is sometimes decreased insufficiently depending on a combination of the first, second and third components. On the other hand, if the proportion of the third component is more than 40% by weight, the clearing point of the resulting liquid crystal composition is sometimes decreased, exerting adverse influences as described above.

The total amount of the first, second and third components is at least 50% by weight of the composition.

The liquid crystal composition of the present invention may contain, as well as the aforementioned components, suitable amounts of other generally known nematic liquid crystals or mesogenic compounds for the purpose of controlling threshold voltage, liquid crystal temperature range, or viscosity, for example, but within the range such that they do not diminish the effects of the present invention.

Examples of such known compounds which can be preferably used in the present invention are shown below.

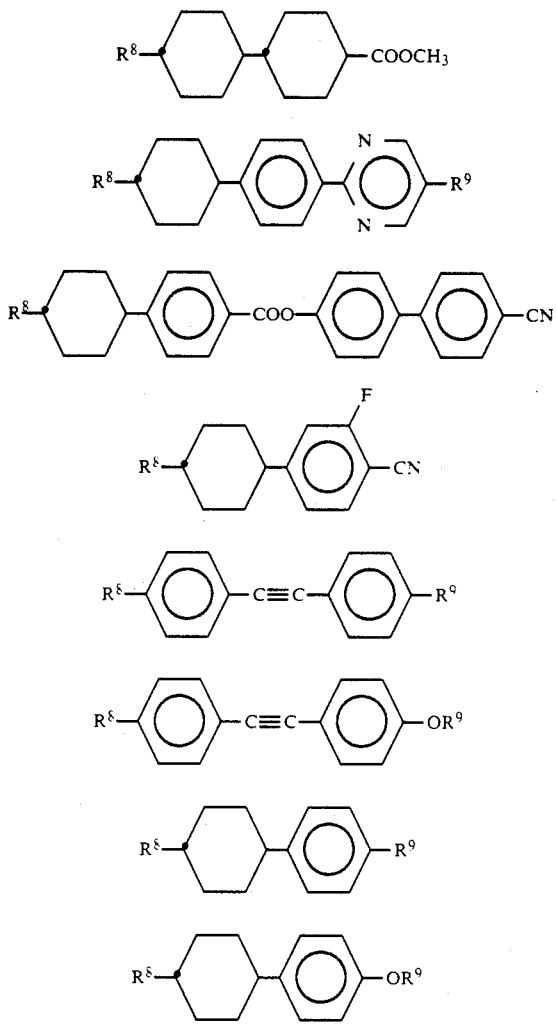

In the above formulas, $R^8$ is an alkyl group having 1 to 8 carbon atoms, and $R^9$ is an alkyl group having 1 to 8 carbon atoms.

Specific examples of the compounds represented by the above formulas are:
4'-cyano-4-biphenylyl 4-(trans-4-ethylcyclohexyl) benzoate,
4'-cyano-4-biphenylyl 4-(trans-4-propylcyclohexyl) benzoate,
4'-cyano-4-biphenylyl 4-(trans-4-butylcyclohexyl) benzoate,
4'-cyano-4-biphenylyl 4-(trans-4-pentylcyclohexyl) benzoate,
4-ethyl-4'-methyldiphenylacetylene,
4-propyl-4'-methyldiphenylacetylene,
4-butyl-4'-methyldiphenylacetylene,
4-hexyl-4'-methyldiphenylacetylene,
4,4'-diethyldiphenylacetylene,
4,4'-dipropyldiphenylacetylene,
4,4'-dibutyldiphenylacetylene,
4-ethoxy-4'-propyldiphenylacetylene,
4-ethoxy-4'-pentyldiphenylacetylene,
2-{4-(trans-4-propylcyclohexyl)phenyl}-5-ethylpyrimidine,
2-{4-(trans-4-propylcyclohexyl)phenyl}-5-propylpyrimidine,
2-{4-(trans-4-propylcyclohexyl)phenyl}-5-butylpyrimidine,
4-(trans-4-propylcyclohexyl)ethylbenzene,
4-(trans-4-ethylcyclohexyl)ethoxybenzene,
4-(trans-4-propylcyclohexyl)ethoxybenzene,
4-(trans-4-propylcyclohexyl)propoxybenzene,
4-(trans-4-propylcyclohexyl)-2-fluorobenzonitrile, and
4-(trans-4-pentylcyclohexyl)-2-fluorobenzonitrile.

The liquid crystal display of the present invention can be produced by known techniques except that the aforementioned liquid crystal composition is used as a liquid crystal. For example, it can be produced by the following process.

First, a pattern electrode is formed in a transparent electrode substrate. After formation of a molecular aligning layer on the transparent electrode substrate employing an aligning agent, a cell is fabricated. After the cell is sealed with a spacer, for example, the liquid crystal composition is introduced into the cell through a filling hole, and then the hole is sealed. Attachments such as polarizers and reflective plates are attached to obtain a liquid crystal display.

The liquid crystal composition of the present invention is suitably improved in characteristics required for liquid crystal compositions to be used in liquid crystal displays of the SBE mode. In particular, the steepness of the voltage-transmittance curve is greatly improved while maintaining a high clearing point and a low viscosity. That is, the liquid crystal composition of the present invention has a high clearing point and a low viscosity, and moreover is excellent in the steepness of the voltage-transmittance curve.

The liquid crystal composition of the present invention is quite suitable for use in liquid crystal displays of the multiplexing display mode, because an $\alpha$ value indicating the steepness of the voltage-transmittance curve is very close to 1.

In the liquid crystal composition of the present invention, as well as the steepness of the voltage-transmittance curve, characteristics as described above can be improved in a well balanced manner by compounding the first and second components, or the first, second and third components in suitable proportions.

The first component of the liquid crystal composition of the present invention comprises, as described above, two or more compounds having an alkoxymethyl group at the terminal thereof. These compounds have larger pretilt angles as compared with compounds having an alkyl group at the terminal thereof and, therefore, it is believed that the compounds of the first component contribute to an increase in the d/p margin and thus to an increase in the yield of liquid crystal display product.

The liquid crystal composition of the present invention possesses the aforementioned characteristics and, therefore, realizes multiplexing of 1/100 to 1/300 duty cycle in the SBE mode.

The liquid crystal composition of the present invention can be used effectively in the 90° TN mode which does not always need the steepness of the voltage-transmittance curve.

Use of the liquid crystal composition of the present invention, having characteristics as described above, provides a liquid crystal display which is excellent in the steepness of the voltage-transmittance curve, is of high multiplexing, and further which is good in contrast.

The present invention is described in greater detail with reference to the following examples. In the examples, percents (%) are all by weight, and alkyl and alkoxy groups are all linear unless otherwise indicated.

Characteristic values of the liquid crystal compositions were measured by the following methods.

Steepness of Voltage-Transmittance Curve ($\alpha$)

The steepness of the voltage-transmittance curve is evaluated by a parameter ($\alpha$) defined by the following equation:

$$\alpha = V_{80}/V_{10}$$

where:
- $V_{80}$ = voltage at which transmittance of light in an optical axis direction vertical to a display surface is 80% of maximum transmittance, and
- $V_{10}$ = voltage at which transmittance of light in an optical axis direction vertical to a display surface is 10% (threshold voltage).

As the parameter ($\alpha$) approaches 1, the voltage-transmittance curve becomes more steep.

$V_{10}$ and $V_{80}$ are measured by the following method.

A test sample is prepared by adding a chiral substance (trade name: S-811, produced by E. Merck.) to a liquid crystal composition in such a manner that d/p=0.42 where:
- d = cell thickness, and
- p = intrinsic helical pitch of a chiral nematic liquid crystal, at which there is no formation of either lower twist or striped domain. This sample is introduced into a cell which has a polyamide-based aligning film (trade name: PSI-871-PPP, produced by Chisso Corp.) subjected to rubbing on the opposing plane transparent electrodes, and which has a twist angle of 180°, under the condition that $\Delta \cdot d = 800$ nm. Polarizing plates are bonded to the top and bottom of the cell in such a manner that the rubbing direction of the aligning film and the absorption axis of the polarizing plate are at an angle of 45° and the absorption axes of the upper and lower polarizing plates are overlapped. Thereafter, $V_{10}$ and $V_{80}$ are measured.

The above aligning film has a pretilt angle of 3.5° when a phenylcyclohexane-based liquid crystal composition (trade name: ZLI-1132, produced by E. Merck.) is employed. The pretilt angle is measured by the crystal rotation method (T. J. Sheffer et al., Journal of Applied Physics, Vol. 48, No. 5, pp. 1783-1792 (1977)).

Number of Multiplexing (Nmax):

The number of multiplexing is evaluated by a parameter Nmax defined by the following equation:

$$N\text{max} = \left( \frac{\alpha^2 + 1}{\alpha^2 - 1} \right)^2$$

where $\alpha$ is the same as indicated above.

As the parameter Nmax increases, higher multiplexing becomes possible.

Viscosity ($\eta$):

Measured with a rotation viscometer (E-type viscometer manufactured by Tokyo Keiki Co., Ltd.).

EXAMPLE 1

First Component:
Trans-4-(trans-4-methoxymethylcyclohexyl)propylcyclohexane: 20%
Trans-4-(trans-4-methoxymethylcyclohexyl)pentylcyclohexane: 10%
4-(Trans-4-methoxymethylcyclohexyl)benzonitrile: 20%, Second Component:
4-{Trans-4-(trans-4-ethylcyclohexyl)cyclohexyl}-benzonitrile: 10%
4-{Trans-4-(trans-4-propylcyclohexyl)cyclohexyl}-fluorobenzene: 5%
4-{Trans-4-(trans-4-propylcyclohexyl)cyclohexyl}-methylbenzene: 5%
4-{Trans-4-(trans-4-propylcyclohexyl)cyclohexyl}-propylbenzene: 15%
4-(Trans-4-pentylcyclohexyl)-4'-ethylbiphenyl: 15%.

The above compounds were mixed to prepare a liquid crystal composition. Characteristic values of the liquid crystal composition are shown in Table 1.

EXAMPLE 2

First Component:
Trans-4-(trans-4-methoxymethylcyclohexyl)propylcyclohexane: 20%
Trans-4-(trans-4-methoxymethylcyclohexyl)pentylcyclohexane: 15%
4-(Trans-4-methoxymethylcyclohexyl)benzonitrile: 15%, Second Component:
4-{Trans-4-(trans-ethylcyclohexyl)cyclohexyl}benzonitrile: 10%
4-{Trans-4-(trans-4-propylcyclohexyl)cyclohexyl}benzonitrile: 10%
4-{Trans-4-(trans-4-pentylcyclohexyl)cyclohexyl}benzonitrile: 10%, Third Component:
4-{Trans-4-(3-butenyl)cyclohexyl}benzonitrile: 10%
4-{Trans-4-(3-pentenyl)cyclohexyl}benzonitrile: 10%.

The above compounds were mixed to prepare a liquid crystal composition. Characteristic values of the liquid crystal composition are shown in Table 1.

EXAMPLE 3

First Component:
Trans-4-(trans-4-methoxymethylcyclohexyl)propylcyclohexane: 10% 30%
4-(Trans-4-methoxymethylcyclohexyl)benzontrile: 10%, Second Component:
4-{Trans-4-(trans-4-ethylcyclohexyl)cyclohexyl}benzonitrile: 10%
4-{Trans-4-(trans-4-propylcyclohexyl)cyclohexyl}benzonitrile: 10%, Third Component:
4-(Trans-4-propylcyclohexyl)benzonitrile: 30%, Other Compounds:
4-(Trans-4-propylcyclohexyl)ethoxybezene: 20%
4'-Cyano-4-biphenylyl 4-(trans-4-pentylcyclohexyl)-benzoate: 5%
4'-Cyano-4-biphenylyl 4-(trans-4-propylcyclohexyl)-benzoate: 5%.

The above compounds were mixed to prepare a liquid crystal composition. Characteristic values of the liquid crystal composition are shown in Table 1.

EXAMPLE 4

First Component:
Trans-4-(trans-4-methoxymethylcyclohexyl)propylcyclohexane: 10%
Trans-4-(trans-4-methoxymethylcyclohexyl)pentylcyclohexane: 15%
4-(Trans-4-methoxymethylcyclohexyl)benzonitrile: 15%,
Second Component:
4-{Trans-4-(trans-4-ethylcyclohexyl)cyclohexyl}benzonitrile: 10%,
Third Component:
4-(Trans-4-propylcyclohexyl)benzonitrile: 10%
4-{Trans-4-(3-butenyl)cyclohexyl}benzonitrile: 10%,
Other Compounds:
2-{4-(Trans-4-propylcyclohexyl)phenyl}-5-ethylpyrimidine: 10%
2-{4-(Trans-4-propylcyclohexyl)phenyl}-5-propylpyrimidine: 10%
2-{4-(Trans-4-propylcyclohexyl)phenyl}-5-butylpyrimidine: 10%.

The above compounds were mixed to prepare a liquid crystal composition. Characteristic values of the liquid crystal composition are show in Table 1.

EXAMPLE 5

First Component:
Trans-4-(trans-4-methoxymethylcyclohexyl)propylcyclohexane: 10%
4-(Trans-4-methoxymethylcyclohexyl)benzonitrile: 10%
Second Component:
4-{Trans-4-(trans-4-butylcyclohexyl)cyclohexyl}benzonitrile: 10%
4-{Trans-4-(trans-4-ethylcyclohexyl)cyclohexyl}methylbenzene: 5%
4-{Trans-4-(trans-4-propylcyclohexyl)cyclohexyl}methylbenzene: 5%
4-{Trans-4-(trans-4-propylcyclohexyl)cyclohexyl}methoxybenzene: 5%
4-{Trans-4-(trans-4-propylcyclohexyl)cyclohexyl}propylbenzene: 10%
4-{Trans-4-(trans-4-propylcyclohexyl)cyclohexyl}fluorobenzene: 5%,
Third Component:
4-(Trans-4-heptylcyclohexyl)benzonitrile: 20%,
Other Compounds:
4-Ethyl-4'-methyldiphenylacetylene: 5%
4,4'-Dibutyldiphenylacetylene: 5%
4-Hexyl-4'-methyldiphenylacetylene: 10%

The above compounds were mixed to prepare a liquid crystal composition. Characteristic values of the liquid crystal composition are shown in Table 1.

COMPARATIVE EXAMPLE

For comparison, known compounds commonly used as shown below were mixed to prepare a liquid crystal composition. Characteristic values of the liquid crystal composition are shown in Table 1.
4'-Ethyl-4-cyanobiphenyl: 15%
4'-Butyl-4-cycanobiphenyl: 10%
4-Butoxyphenyl trans-4-propylcyclohexanecarboxylate: 16%
4-Ethoxyphenyl trans-4-butylcyclohexanecarboxylate:12%
4-Methoxyphenyl trans-4-pentycyclohexanecarboxylate: 12%
4-Ethoxyphenyl trans-4-propylcyclohexanecarboxylate: 10%
4-Ethoxyphenyl trans-4-pentylcyclohexanecarboxylate: 10%
4'-(Trans-4-pentylcyclohexyl)-4-cyanobiphenyl: 15%

TABLE 1

| | Clearing Point (°C.) | Δn | η (cp) | V₁₀ (V) | α | Nmax |
| --- | --- | --- | --- | --- | --- | --- |
| Ex. | | | | | | |
| 1 | 101.5 | 0.101 | 25.5 | 2.26 | 1.087 | 144 |
| 2 | 98.5 | 0.102 | 27.5 | 2.02 | 1.066 | 245 |
| 3 | 93.5 | 0.129 | 27.3 | 1.59 | 1.079 | 174 |
| 4 | 98.5 | 0.119 | 26.8 | 1.73 | 1.093 | 127 |
| 5 | 88.2 | 0.129 | 20.7 | 1.87 | 1.082 | 161 |
| Com. Ex. 1 | 78.8 | 0.142 | 33.9 | 2.03 | 1.120 | 79 |

$\Delta n$, $V_{10}$, $\alpha$: measured at 25° C.
$\eta$: measured at 20° C.

It can be seen from the results of Table 1 that the liquid crystal composition of the present invention has a high clearing point and a low viscosity, and further is excellent in the steepness of the voltage-transmittance curve, providing higher multiplexing.

What is claimed is:
1. A liquid crystal composition comprising:
(1) a first component consisting of at least one compound selected from the compounds represented by the general formula (I):

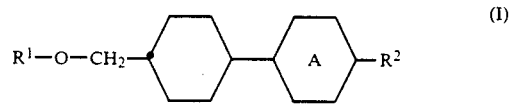

(I)

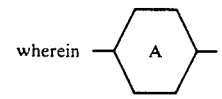

wherein A is $R^1$ is an alkyl group having 1 to 5 carbon atoms and $R^2$ is an alkyl group having 2 to 8 carbon atoms, and at least one compound selected from the compounds represented by the general formula (II):

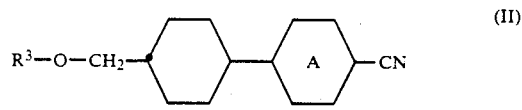

(II)

wherein A is the same as defined above; and $R^3$ is an alkyl group having 1 to 5 carbon atoms, and
(2) a second component consisting of at least one compound selected from the compounds represented by the general formula (III):

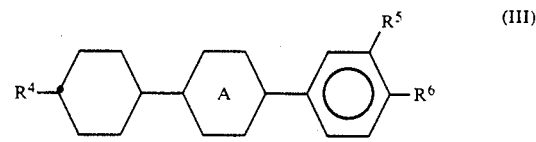

(III)

-continued

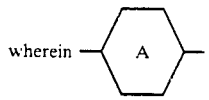

is the same as defined above;
R$^4$ is an alkyl group having 2 to 8 carbon atoms; R$^5$ is H or F; and R$^6$ is an alkyl group having 1 to 8 carbon atoms, an alkoxyl group having 1 to 8 carbon atoms, F or a CN group.

2. A composition as claimed in claim 1 wherein the proportions of the first component and the second component are 20 to 50% by weight and 10 to 70% by weight, respectively, based on the total weight of the composition, and the total amount of the first and second components is at least 40% by weight of the composition.

3. A composition as claimed in claim 1, further including a third component consisting of at least one compound selected from the compounds represented by the general formula (IV):

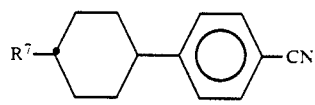 (IV)

wherein R$^7$ is an alkyl group having 2 to 10 carbon atoms or an alkenyl group having 2 to 10 carbon atoms.

4. A composition as claimed in claim 3 wherein the the proportions of the first component, the second component and the third component are 20 to 50% by weight, 10 to 70% by weight and 10 to 40% by weight, respectively, based on the total weight of the composition, and the total amount of the first, second and third components is at least 50% by weight of the composition.

5. A composition as claimed in claim 1, further including at least one known nematic liquid crystal compound or mesogenic compound.

6. A liquid crystal display element including a cell and a liquid crystal composition comprising:
(1) a first component consisting of at least one compound selected from the compounds represented by the general formula (I):

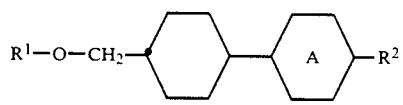 (I)

R$^1$ is an alkyl group having 1 to 5 carbon atoms and R$^2$ is an alkyl group having 2 to 8 carbon atoms, and at least one compound selected from the compounds represented by the general formula (II):

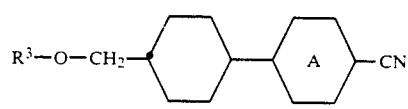 (II)

-continued

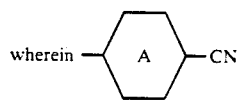

is the same as defined above; and R$^3$ is an alkyl group having 1 to 5 carbon atoms, and
(2) a second component consisting of at least one compound selected from the compounds represented by the general formula (III):

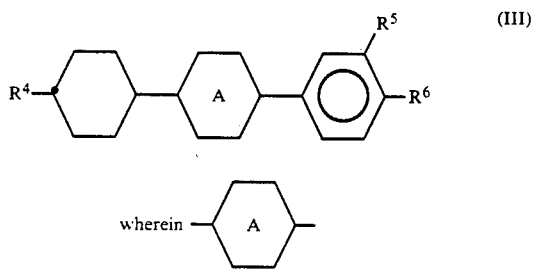 (III)

is the same as defined above; R$^4$ is an alkyl group having 2 to 8 carbon atoms; R$^5$ is H or F; and R$^6$ is an alkyl group having 1 to 8 carbon atoms, an alkoxyl group having 1 to 8 carbon atoms, F or a CN group.

7. A composition as claimed in claim 1 wherein

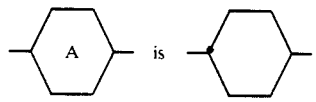

in general formula (I).

8. A composition as claimed in claim 1 wherein R$^1$ is a linear alkyl group having 1 to 3 carbon atoms.

9. A composition as claimed in claim 1 wherein R$^2$ is a linear alkyl group having 2 to 5 carbon atoms.

10. A composition as claimed is claim 1 wherein

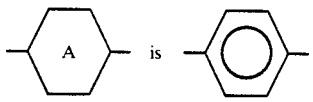

in general formula (II).

11. A composition as claimed in claim 1 wherein R$^3$ is a linear alkyl group having 1 to 3 carbon atoms.

12. A composition as claimed in claim 1 wherein

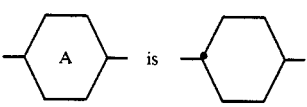

in general formula (III).

13. A composition as claimed in claim 1 wherein R$^5$ is H.

14. A composition as claimed in claim 1 wherein R$^6$ is CN.

15. A composition as claimed in claim 3 wherein R$^7$ is a linear alkyl group having 2 to 7 carbon atoms.

16. A composition as claimed in claim 3 wherein $R^7$ is a linear alkenyl group having 3 to 5 carbon atoms.

17. A composition as claimed in claim 3 wherein said alkenyl group has an inner double bond in a trans configuration.

18. A liquid crystal display element as claimed in claim 6 wherein said composition further includes a third component consisting of at least one compound selected from the compounds represented by the general formula (IV):

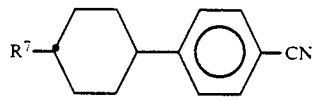

wherein $R^7$ is an alkyl group having 2 to 10 carbon atoms or an alkenyl group having 2 to 10 carbon atoms.

19. A liquid crystal display element as claimed in claim 6 wherein said display element has an SBE mode.

20. A composition as claimed in claim 1 for use in an SBE mode.

* * * * *